United States Patent [19]
Hurlburt et al.

[11] Patent Number: 5,447,321
[45] Date of Patent: Sep. 5, 1995

[54] OSCILLATION STOP MECHANISM FOR COMPACT TRACTORS

[75] Inventors: Joseph C. Hurlburt; Charles A. Hansen, both of Lancaster, Pa.

[73] Assignee: New Holland North America, Inc., New Holland, Pa.

[21] Appl. No.: 273,084

[22] Filed: Jul. 8, 1994

[51] Int. Cl.⁶ .............................................. B62D 5/26
[52] U.S. Cl. .................................. 280/97; 280/109; 280/111; 280/117; 180/79.4; 180/156; 180/266
[58] Field of Search ............... 280/93, 95.1, 97, 98, 280/103, 109, 111, 113, 114, 116, 117, 125, 126, 127, 130, 132, 133; 180/79, 79.3, 79.4, 266, 267, 234, 144, 155, 156, 53.7, 53.1

[56] References Cited

U.S. PATENT DOCUMENTS

| | | | |
|---|---|---|---|
| 810,091 | 1/1906 | Springer | 280/111 |
| 2,994,546 | 8/1961 | Cooper | 280/111 |
| 3,027,963 | 4/1962 | Nicholson | 280/97 |
| 3,370,670 | 2/1968 | Love | 280/111 |
| 5,046,577 | 9/1991 | Hurlburt | 280/97 |
| 5,219,180 | 6/1993 | Zipser et al. | 280/759 |
| 5,322,309 | 6/1994 | Hurlburt | 280/97 |
| 5,322,310 | 6/1994 | Hurlburt | 280/97 |

FOREIGN PATENT DOCUMENTS

| | | | |
|---|---|---|---|
| 0006170 | 1/1984 | Japan | 180/144 |
| 0007545 | 8/1989 | WIPO | 280/97 |

Primary Examiner—Margaret A. Focarino
Assistant Examiner—Peter C. English
Attorney, Agent, or Firm—Larry W. Miller; Frank A. Seemar

[57] ABSTRACT

An oscillation stop mechanism for use in conjunction with a compound steering mechanism adapted for use on a compact tractor is disclosed wherein an elongated stop link is positioned on opposing sides of the steering axis about which the pivoted axle rotates to effect a compound steering action as a function of the amount of steering movement of the steerable wheels. The elongated stop links are provided with upper and lower cupped flanges that are engageable with corresponding upper and lower brackets affixed, respectively, to the chassis and the front axle to stop the pivotal movement of the front axle about its oscillation axis. The upper flange on each stop link is positionally adjustable along the length of the stop link for selectively varying the linear distance between the upper and lower flanges and, thereby, vary the amount of permissible oscillation of the front axle relative to the chassis.

18 Claims, 10 Drawing Sheets

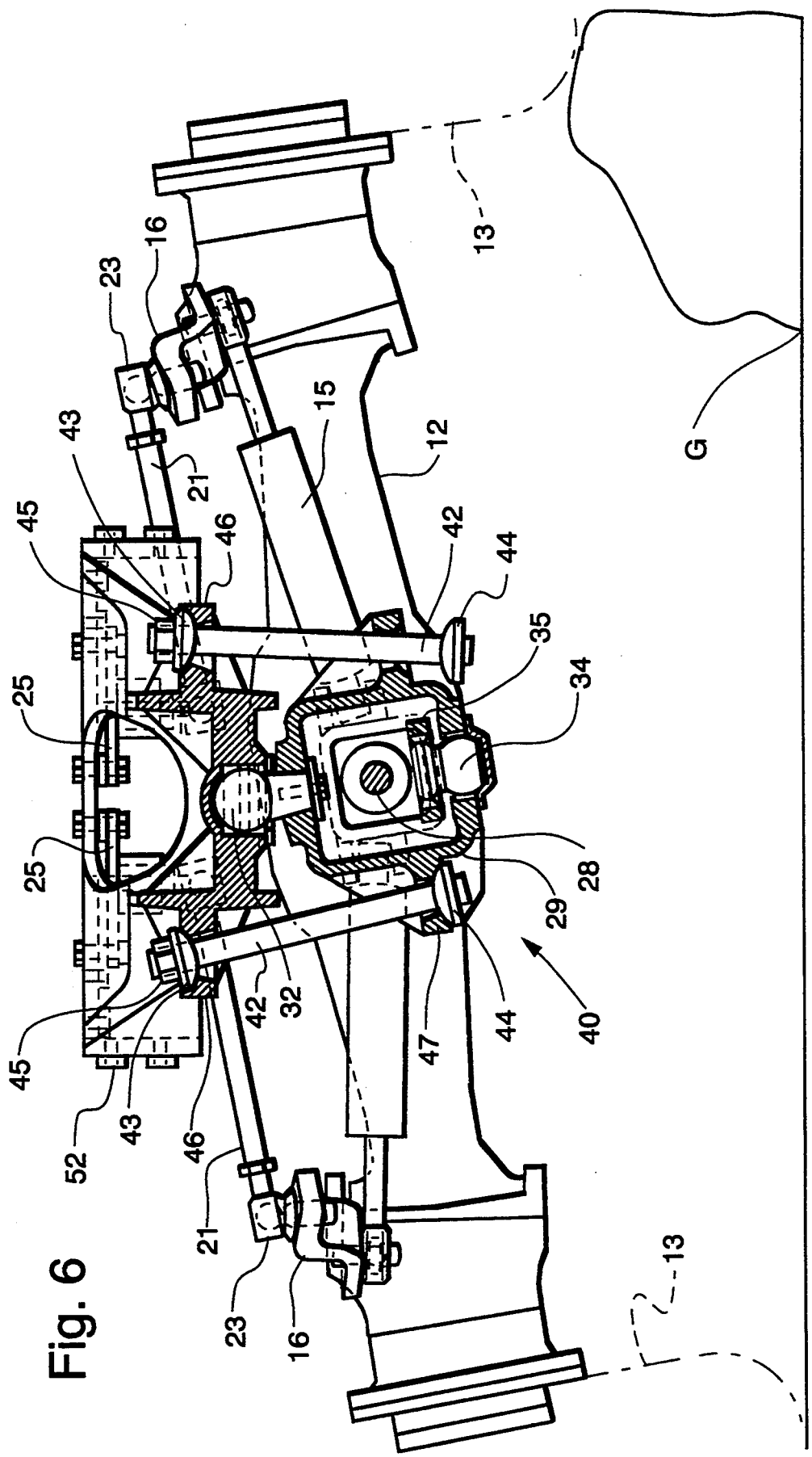

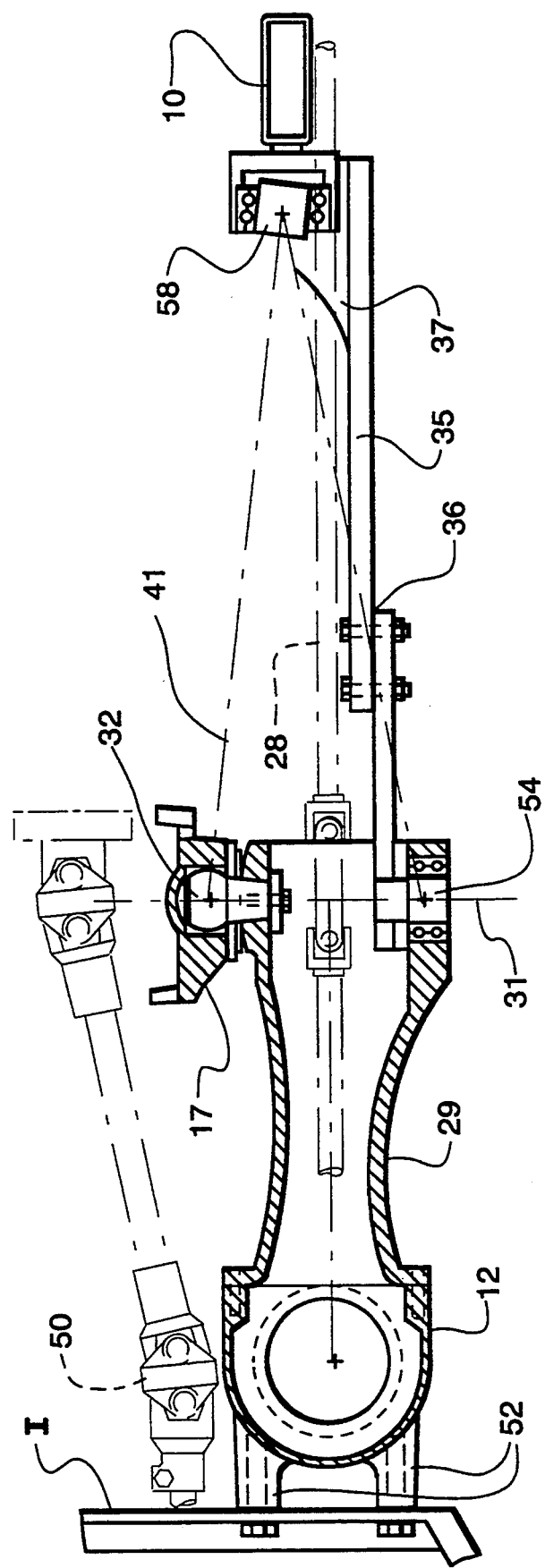

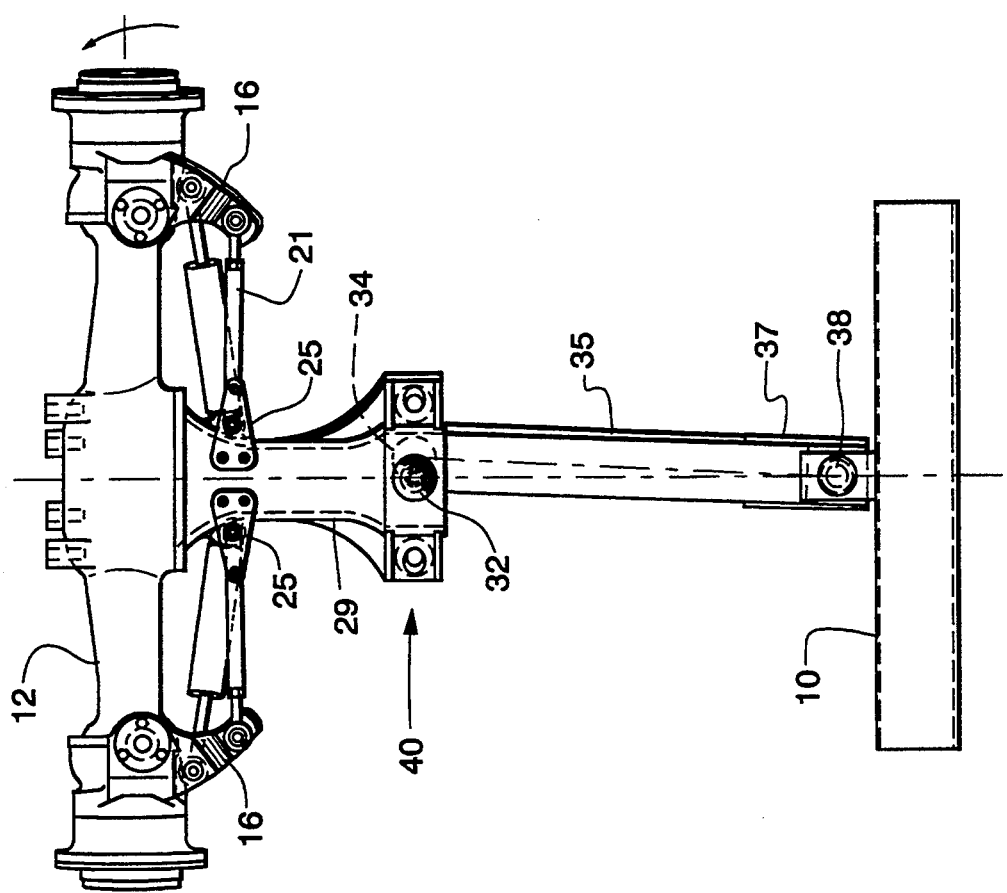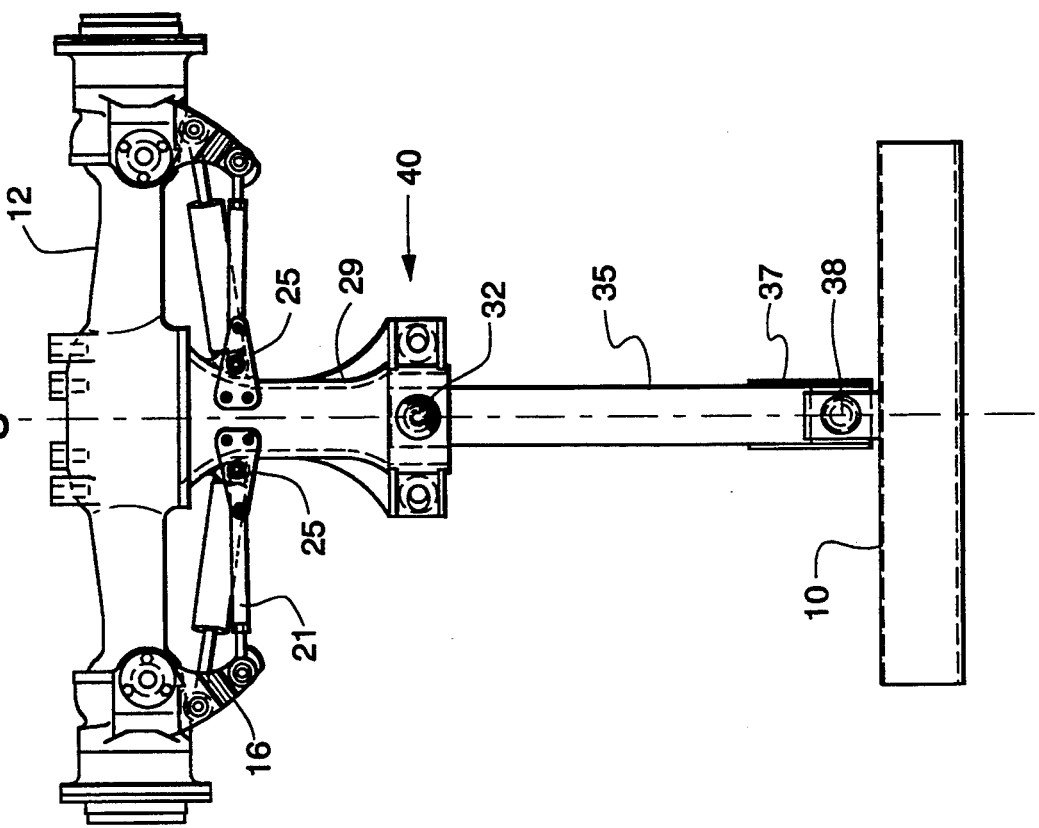

OSCILLATION STOP MECHANISM FOR COMPACT TRACTORS

BACKGROUND OF THE INVENTION

This invention relates generally to off-road motor vehicles, such as tractors, and more particularly, to an oscillation stop mechanism, cooperable with a compound steering mechanism in which the front axle is pivotally moved in conjunction with the steering movement of the steerable wheels, to limit the amount of vertical oscillation of the front axle relative to the chassis of the tractor.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Although supplemental driving power is often provided to the steerable ground engaging wheels, a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse extension of cylinder rod, causing a turning of the wheels.

Due to physical limitations relating to the range of movement of the steering mechanism and to the eventual interference between the steerable wheels and the chassis or the steering axle, the amount of pivotal movement of the steerable wheels relative to the steering axle is limited to a given turning angle. This maximum turning angle defines the minimum turning radius of the tractor for a given wheel base length and tread spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

Because of the size and orientation of the axle support and oscillation components, known compound steering mechanisms, such as found in U.S. Pat. No. 5,297,648, granted on Mar. 29, 1994, to C. A. Hansen and J. C. Hurlburt, are not well suited for small tractors, particularly when front hitch and front PTO applications are desired. Likewise, the oscillation stop mechanism shown in the aforementioned U.S. Pat. No. 5,297,648, and for which U.S. Pat. No. 5,322,309, granted Jun. 21, 1994, to J. C. Hurlburt, is not well suited to compact tractors because of the size of the related components. Economy is also a major concern with small tractors as the incremental cost of providing a compound steering mechanism and an associated oscillation stop apparatus becomes a greater percentage of the overall cost of the small tractor. By providing a compact oscillation stop mechanism immediately behind the front axle, a front-mounted attachment could be brought closer to the axle and economies maintained.

SUMMARY OF THE INVENTION

It is an object of this invention to overcome the aforementioned disadvantages of the prior art by providing an oscillation stop mechanism for use in conjunction with a compound steering mechanism on a compact tractor in which the pivot support for the front axle and the oscillation stop mechanism are positioned immediately behind the front axle.

It is feature of this invention that the oscillation stop apparatus can be compactly designed in conjunction with the compound steering mechanism pivot coupled to the steering mechanism for affecting a simultaneous pivotal movement of the steering axle relative to the chassis.

It is another object of this invention to provide an oscillation stop mechanism design that can be adapted for small tractors.

It is still another object of this invention to locate the oscillation stop system behind the front axle to compliment the compact design of the pivotal support for the front axle.

It is yet another object of this invention to provide a pivot mechanism pivotally supporting the steering axle relative to the chassis of the vehicle to enable a pivotal movement of the steering axle about a generally vertical axis, as well as a rolling oscillation of the steering axle about a longitudinally extending, horizontal axis relative to the chassis.

It is a further object of this invention to provide an oscillation stop mechanism that can be structurally and economically adapted to small tractors.

It is another feature of this invention that the pivot mechanism connecting the front axle to the tractor chassis includes a lower pivot joint that is mounted for transverse swinging movement relative to an upper pivot joint to accommodate oscillatory movement of the front axle.

It is an advantage of this invention that the configuration of the compound steering mechanism and oscillation stop package is compatible with front axle mounted front weights, front hitch and front PTO applications.

It is another advantage of this invention that the compound steering mechanism and oscillation stop apparatus improves maneuverability of small tractors.

It is still another feature of this invention that the oscillation stop includes elongated, generally vertical stop links positioned on opposing sides of the generally longitudinally extending axis about which the steerable axis oscillates.

It is yet another feature of this invention that the opposing stop links can be independently adjusted to provide differing amounts of permissible oscillation of the front axle with respect to opposing steering directions.

It is still another advantage of this invention that the oscillation axis of the front axle is elevated to increase tractor stability.

It is still a further object of this invention to provide an oscillation stop apparatus cooperable with a compound steering mechanism that can be economically manufactured so as to minimize the incremental cost of providing such mechanisms for small, compact tractors.

It is yet a further object of this invention to provide an oscillation stop mechanism for compact tractors which is durable in construction, inexpensive of manufacture, carefree of maintenance, facile in assemblage, and simple and effective in use.

These and other objects, features, and advantages are accomplished according to the instant invention by providing an oscillation stop mechanism for use in conjunction with a compound steering mechanism adapted for use on a compact tractor wherein an elongated stop link is positioned on opposing sides of the steering axis about which the pivoted axle rotates to effect a compound steering action as a function of the amount of steering movement of the steerable wheels. The elongated stop links are provided with upper and lower cupped flanges that are engageable with corresponding upper and lower brackets affixed, respectively, to the chassis and the front axle to stop the pivotal movement of the front axle about its oscillation axis. The upper flange on each stop link is positionally adjustable along the length of the stop link for selectively varying the linear distance between the upper and lower flanges and, thereby, vary the amount of permissible oscillation of the front axle relative to the chassis.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a cross-sectional view similar to that of FIG. 5, except that the right steerable wheel has vertically moved relative to the opposing steerable wheel sufficiently to engage the corresponding oscillation stop link;

FIG. 7 is a schematic cross-sectional view showing a side elevation of an alternate pivot mechanism connecting the front axle to the tractor chassis to best show the steering axis, the oscillation axis and the effective tension axis of the support link, the PTO shaft and the front wheel drive shaft being shown in phantom, a front mounted implement being mounted to the steerable axle and broken away to better show the details of the alternate pivot mechanism;

FIG. 8A is a schematic top plan view corresponding to the view of FIG. 7 with the steering component effecting a straight ahead operation;

FIG. 8B is a schematic top plan view similar to that of FIG. 8A, except that the right steerable wheel has been elevated to show the effect of front axle oscillation on the lower pivot and support link;

DETAILED DESCRIPTION OF THE PREFERRED EMBODIMENT

Figure 1:
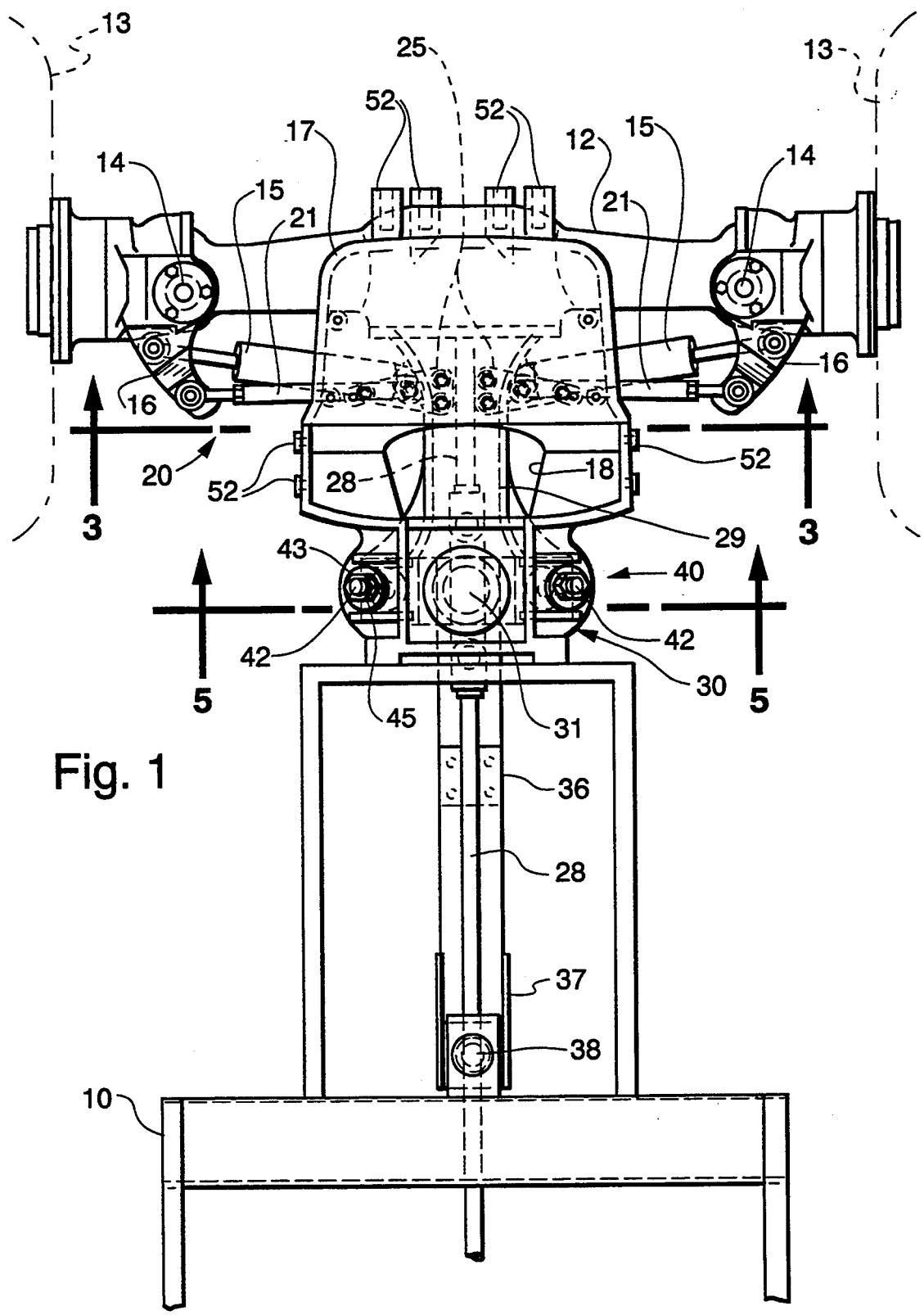
FIG. 1 is a fragmentary top plan view of the steering axle incorporating the principles of the instant invention, located at the forward portion of a tractor chassis, the tie rod mounting plates being oriented in their inboardmost position.

Referring now to the drawings and, particularly, to FIGS. 1–4, a compound steering mechanism incorporating the principles of the instant invention and being designed for incorporation into small, compact tractors can best be seen. The tractor chassis 10 consists of a conventional wheeled frame supported by front and rear axles having ground engaging wheels attached thereto. The chassis 10 is representatively shown throughout all of the drawings. One skilled in the art will readily recognize that the chassis 10 can also consist of a conventional "buckle-up" design in which the front axle is bolted to the engine E, which is bolted to the transmission, which is bolted to the rear axle assembly, etc., without the benefit of a formal frame structure supporting all of these components. In the drawings, only the front steerable axle 12 and the forward portion of the representative chassis 10 are depicted.

The front steerable wheels 13 mounted on the opposing ends of the front axle 12 are pivotally connected to the axle 12 in a generally conventional manner so as to pivot about a king pin 14 relative to the front axle 12 to effect a steering or turning of the tractor T. The front wheels 13 can be mounted in a plurality of positions to vary the spacing between the opposing front wheels for different row crop spacings. Hydraulic steering cylinders 15 interconnect the front axle 12 with respective steering arms 16 extending rearwardly from the wheels 13 to control the pivotal steering movement thereof. The chassis 10 includes a front chassis member 17 that projects forwardly in a cantilevered manner, whether fastened to the main chassis frame 10 as depicted in the drawings or fastened to the engine block in a conventional "buckle-up" chassis design, to provide support for a radiator or other tractor or engine components.

The steering mechanism 20 includes a pair of tie rods 21 pivotally connected to the respective steering arms 16 and extending inwardly therefrom to a pivotal connection with the front chassis member 17, which is provided with a plurality of bosses 19 terminating in a common plane. A detachable triangular mounting plate 25 supports a pivotal connection for the inboard end 22 of each respective tie rod 21. The mounting plates 25 are attachable to a corresponding set of bosses 19 to fix the inboard ends 22 of the tie rods 21 to the chassis 10. As will be described in greater detail below, the mounting plates 25 can be selectively mounted on alternative sets of bosses 19 to locate the inboard ends 22 of the tie rods 21 closer or further away from the longitudinal centerline of the tractor T.

The front axle 12 has a rearwardly extending trumpet portion 29 connected to the front chassis member 17 by a steering pivot mechanism 30 defining a steering axis 31 about which the front axle 12 pivotally moves. The pivot mechanism 30 includes an upper pivot joint 32, preferably in the form of a spherical or ball joint to provide for proper swinging movement of the steering axis 31, as will be described in greater detail below. The upper pivot joint 32 is fixed in the front chassis member 17.

The steering pivot mechanism 30 further includes a lower pivot joint 34 mounted in the trumpet portion 29 and connected to a support link 35 extending forwardly from a rearward pivot joint 38 mounted in a fixed location on the chassis 10. Both the lower and rearward pivot joints 34, 38 are preferably spherical joints to allow a multi-directional freedom of movement. During oscillation movements described in greater detail below, the lower pivot joint 34 will swing laterally relative to the upper pivot joint 32. The use of spherical joints at each of the pivots 32, 34, 38 will accommodate this oscillatory movement.

Figure 4:
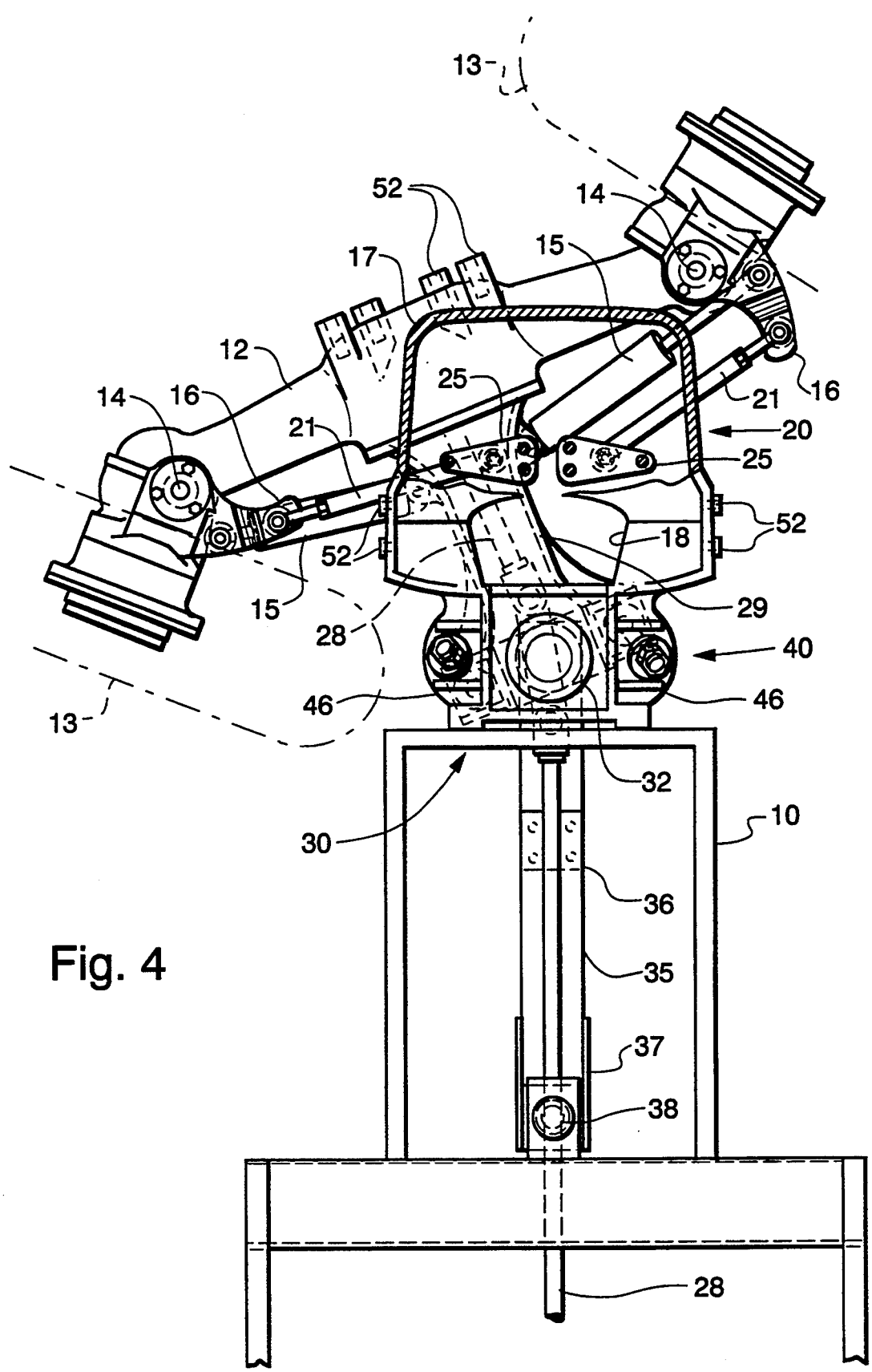
FIG. 4 is a partial top plan view of the steering axle similar to that of FIG. 1 with the steerable ground wheels being pivoted along with the steering axle into a maximum left turn position, the ground wheels are shown in an innermost mounted position to reflect the maximum inboard position of the ground wheels, the forward portion of the front chassis member being broken away to better show the steering mechanism, the tie rod mounting plates being oriented in their inboardmost position.

One skilled in the art will readily recognize that the distance between the upper and lower pivots 32, 34 is fixed as both pivots 32, 34 are mounted to the trumpet portion 29. Likewise, the distance between the upper and rearward pivots 32, 38 is also fixed as both pivots 32, 38 are mounted to the chassis 10. The three pivots 32, 34, 38 form a "journaling triangle" to provide great flexibility in the freedom of movement of the front axle 12 in both steering and oscillation actions. To accommodate the position of the inboard front wheel 13 when located in its innermost position and undergoing a severe turning angle, as depicted in FIG. 4, the front chassis member 17 is recessed in the area of the steering pivot mechanism 30.

To facilitate assembly, the support link 35 is constructed as a two-piece device with a bolted joint 36 therebetween. At the connection with the rearward pivot 38, the support link 35 includes a U-shaped bracket 37 to allow the passage of a drive shaft 28 through the bracket 37 to connect with the front axle 12 to provide operative rotational power thereto. From the bracket 37 forwardly, the drive shaft 28 is shielded from below by the support link 35 as the drive shaft 28 passes between the support link 35 and the chassis 10. As best seen in FIG. 7, one skilled in the art will recognize that the bolted joint 36 is located along an effective line of force passing between the lower and rearward pivots 34, 38 to minimize the forces on the fasteners connecting the bolted joint 36, as well as the fasteners retaining the pivot joints 34, 38.

As can be best seen in FIGS. 1–8B, an oscillation stop mechanism 40 is provided to limit the vertical rolling oscillation of the front axle 12. As representatively depicted in FIG. 6, the front axle 12 and trumpet portion 29 undergo a vertical rolling oscillation in response to undulations in the ground G, whenever one of the front wheels 13 becomes elevated, so that the chassis 10 can remain generally level. This rolling oscillatory movement of the front axle 12 is accommodated within the steering pivot mechanism 30 as the lower pivot joint 34 is free to swing laterally via the pivotal connection of the support link 35 through the rearward pivot 38.

The purpose of the support link 35 is primarily to maintain the predetermined spacing between the rearward pivot 38 and the lower pivot 34, while allowing the lateral swinging movement of the lower pivot 34. Since the upper pivot 32 is a spherical joint, the steering axis 31 undergoes a corresponding movement remaining aligned with the fixed upper pivot 32 and the swingable lower pivot 34. Referring specifically to FIGS. 8A and 8B, the lower pivot 34 and, therefore, the front axle 12 rotate about an oscillation axis 41, corresponding to a line passing through the upper pivot 34 and the rearward pivot 38.

The oscillation stop mechanism 40 provides a limit to the amount of rolling oscillatory movement permitted to the front axle 12 to prevent interference between various tractor components. The oscillation stop mechanism 40 includes a pair of laterally spaced stop links 42 positioned, respectively, on opposing sides of the steering pivot mechanism 30. Each stop link 42 passes through an upper bracket 46 formed as part of the front chassis member 17 and through a lower bracket 47 formed as part of the trumpet portion 29 of the front axle 12. Each stop link 42 has an upper and lower cupped flange 43, 44 having a curved surface engageable with a seat formed in the corresponding bracket 46, 47. One of the flanges 43, 44 is operatively engaged with an adjustment mechanism 45 to position that flange 43, 44 along the length of the stop link 42 and, thereby, selectively vary the distance between the upper and lower flanges 43, 44 to control the amount of rolling oscillation permitted the front axle 12. For ease of access, the upper flange 43 is preferably positionally adjustable.

Figure 5:
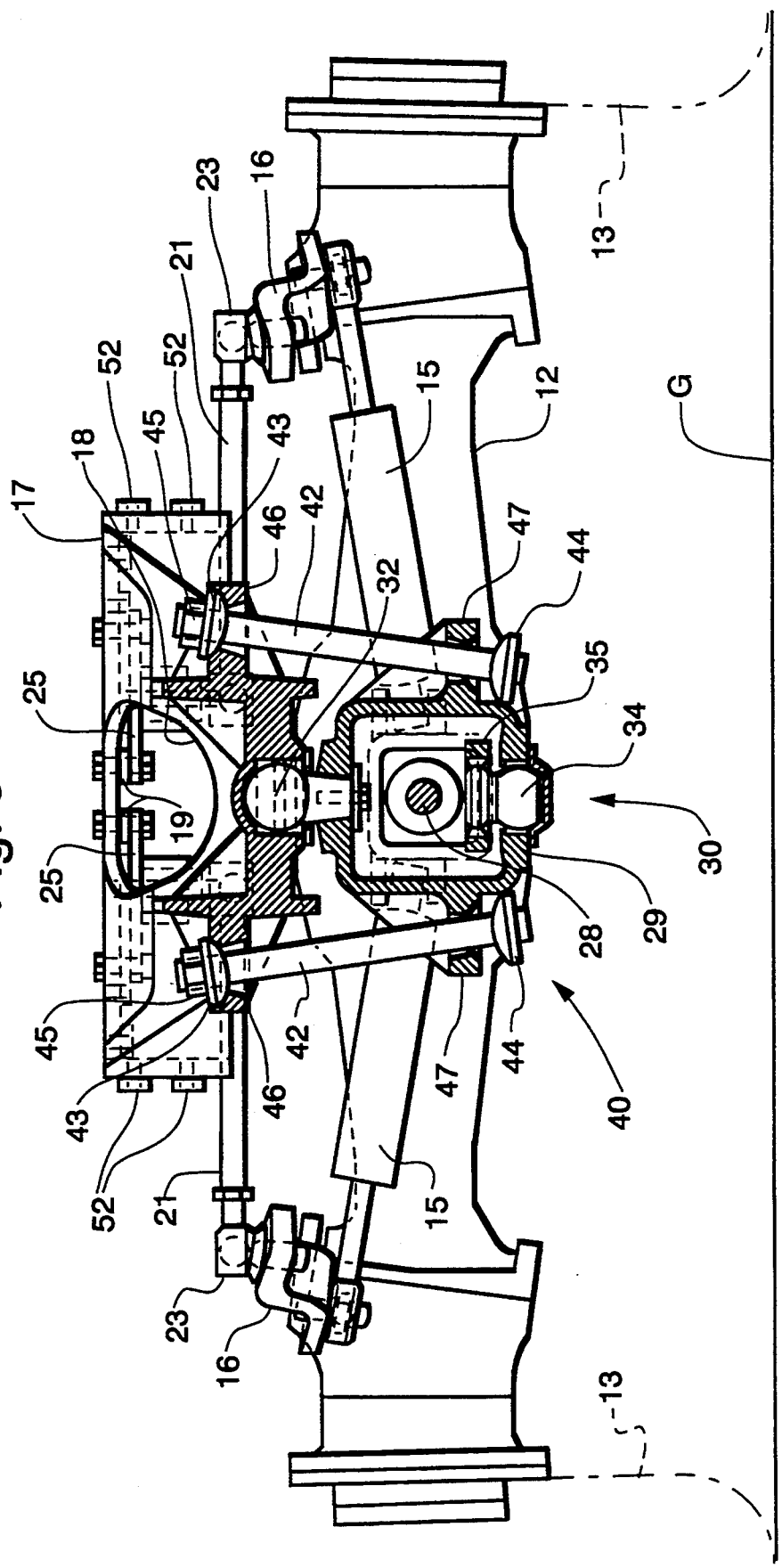
FIG. 5 is a cross-sectional view taken along lines 5—5 of FIG. 1 to better show the oscillation stop mechanism and the upper and lower pivot joints forming a part of the pivot mechanism mounting the front axle to the tractor chassis.

The normal operating distance between the upper and lower flanges 43, 44 is greater that the vertical distance between the upper and lower brackets 46, 47, as is best seen in FIG. 5. Whenever one of the front wheels 13 rises in elevation relative to the other front wheel 13, as representatively demonstrated in FIG. 6, the front axle 12 pivots about the oscillation axis 41 causing the upper and lower brackets 46, 47 corresponding to the front wheel 13 that is lower in elevation to separate a greater distance than the normal operating distance. At the point at which maximum desired rolling oscillation is reached, the bottom bracket 47 bottoms out against the lower flange 44.

As a result, the stop link 42 then stops any further pivotal movement of the front axle 12 about the oscillation axis 41 and any further increases in elevation of the higher wheel will be transferred directly to the chassis 10. The oscillation stop mechanism 40 also operates to limit the rolling oscillation of the front axle 12 while steering. Since the lower brackets 47 move in a fore-and-aft direction when the front axle 12 pivots about the upper pivot joint 32, the effective distance between the upper and lower brackets 46, 47 increases as the front axle 12 pivots as part of the steering action, which in turn decreases the amount of rolling oscillation permitted by the front axle 12.

Figure 11:
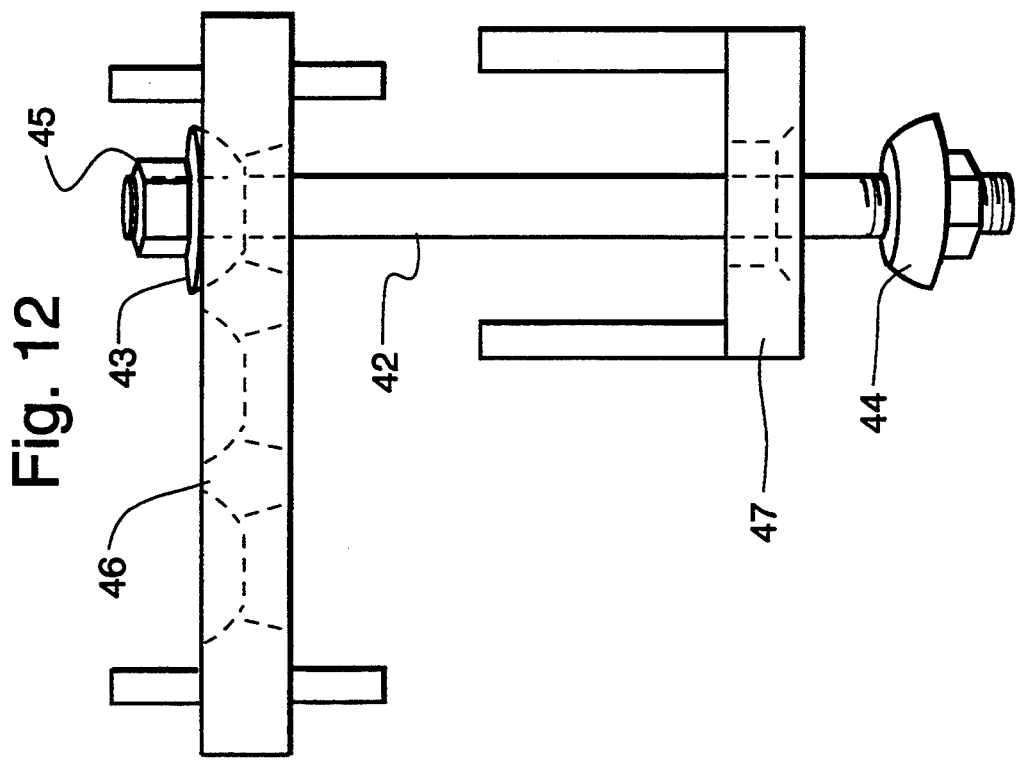
FIG. 11 is an enlarged schematic elevational view of the left oscillation stop mechanism depicting an alternative configuration of the stop link when in the straight ahead, non-turning orientation, an oppositely mounted stop link being shown in phantom.
Figure 12:
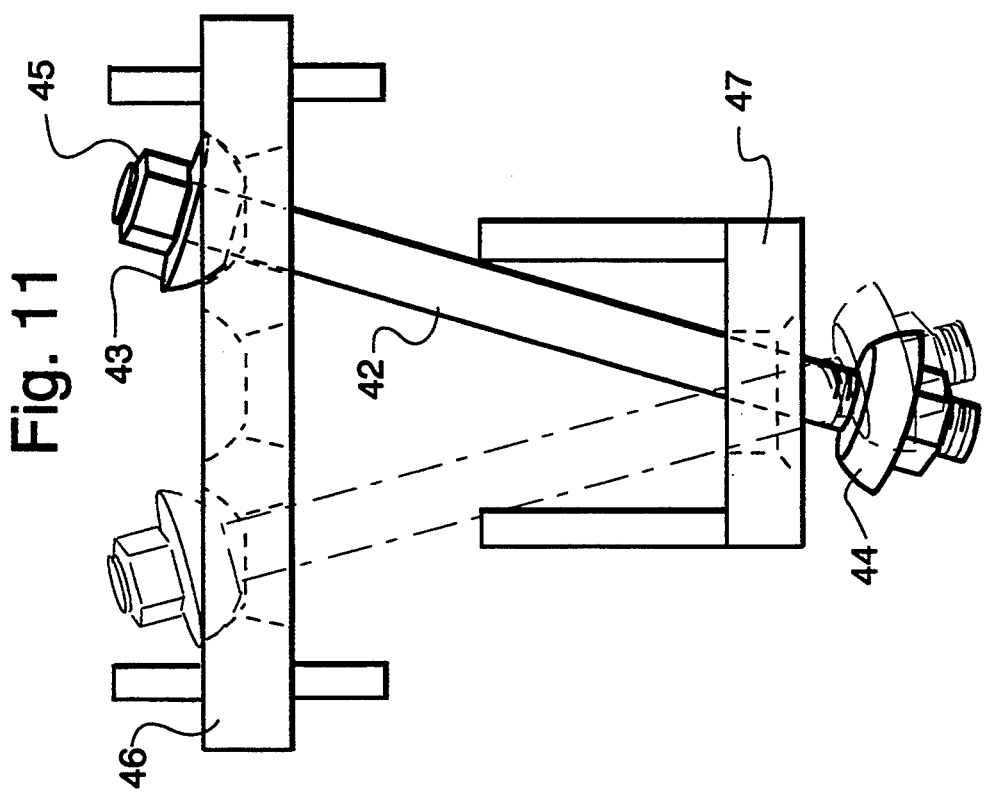
FIG. 12 is an enlarged schematic view similar to that of FIG. 11, except that the steerable axle has undertaken pivotal movement relative to the chassis during a left turning operation.

One skilled in the art will readily realize that the manipulation of the adjustment mechanism 45 to reposition the upper flange 43 relative to the lower flange 44 will result in a variation of the amount of rolling oscillation permitted to the front axle 12 relative to the chassis 10. One skilled in the art will also recognize, as depicted in FIGS. 11 and 12, that a repositioning of the stop link 42 relative to the upper and/or lower brackets 46, 47, such as within alternate mounting seats in the upper bracket 46, or an actual re-positioning of the upper and/or lower brackets 46, 47 to move the stop link 42 in a fore-and-aft direction will also change the operational characteristics of the oscillation stop mechanism 40 as a function of the steering angle.

Figure 2:
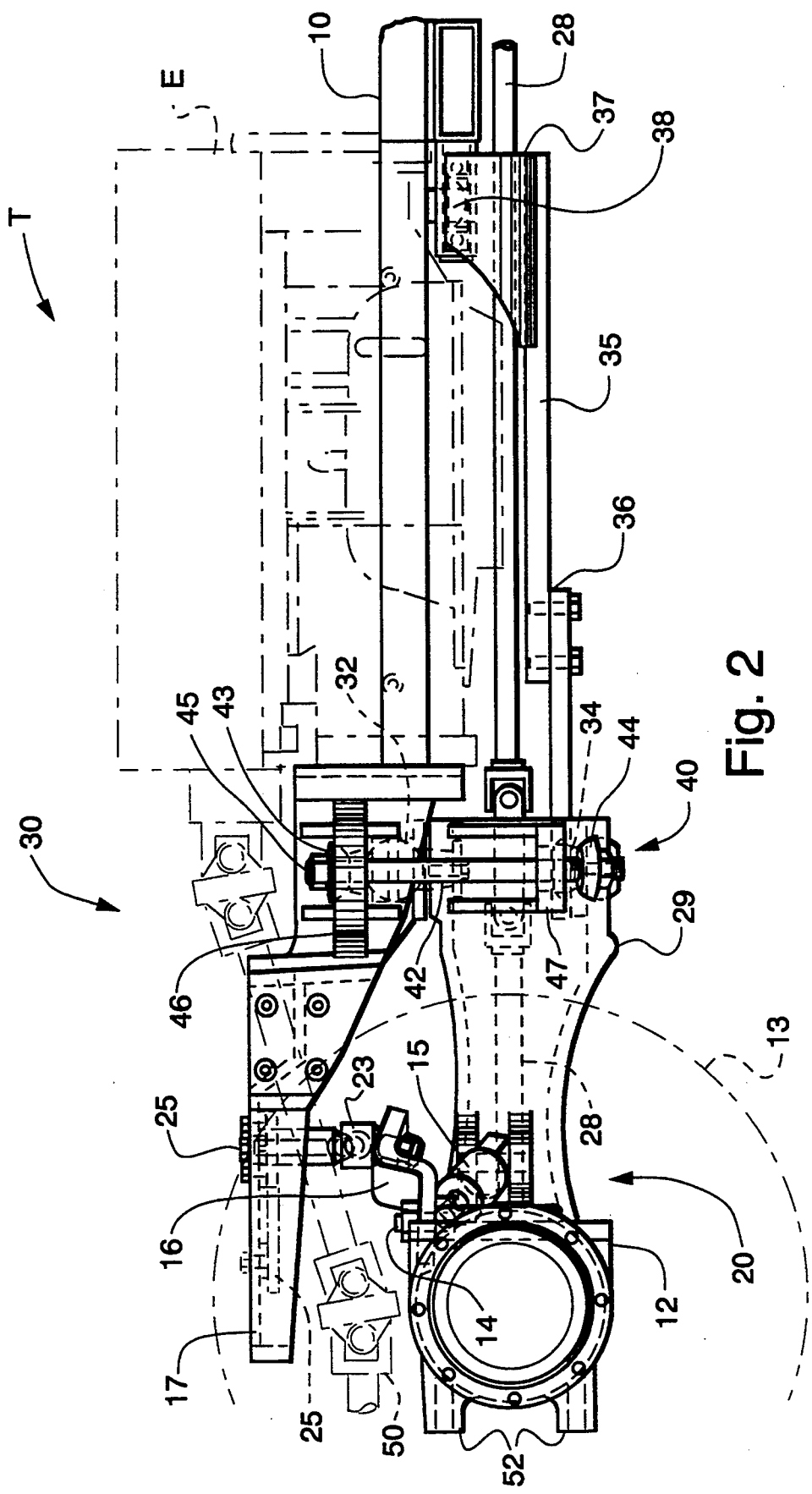
FIG. 2 is a side elevational view of the steering mechanism shown in FIG. 1, a representative engine, front PTO shaft and front steerable wheels being shown in phantom, a tie rod mounting plate oriented in its outboardmost position also being shown in phantom.

For example, a re-positioning of the stop links 42 within the upper brackets 46 rearwardly of the position depicted in FIG. 2 would result in an increase in the permissible vertical raising of the front wheel 13 if the front wheel 13 moves forwardly relative to the chassis 10, as the effective distance between the opposing upper and lower brackets 46, 47 would decrease, and a decrease in the permissible vertical raising of the front wheel 13 when the front wheel 13 moves rearwardly relative to the chassis 10. Such an oscillation characteristic could be desirable if the chassis 10 can accommodate greater amounts of vertical movement of the front wheel 13 forwardly of the straight ahead position, such as when the front wheel 13 is positioned by the pivotal movement of the front axle 12 forwardly of the front chassis member 17, but would impact chassis 10 structure when the front wheel 13 is moved rearwardly of the straight ahead position.

Referring now to all the Figures, but particularly to FIG. 2, one skilled in the art will readily recognize that the engine E can be provided with a forwardly extending power-takeoff (PTO) shaft 50 to be operatively connected with an implement I positioned forwardly of the chassis 10 to provide operative power thereto. Both the front chassis member 17 and the front axle 12 are adapted with mounting bosses 52 to which forwardly positioned or front-mounted implements could be alternatively attached. By attaching a front-mounted implement to the front axle 12, the implement would pivotally move with the steering of the axle 12, as is described in greater detail in U.S. Pat. No. 5,299,821, issued on Apr. 5, 1994, to J. C. Hurlburt. In some situations, however, the implement would be best operable if mounted on the chassis, which would then not move laterally with the steering motion of the front axle.

Since the front chassis member 17 supports the radiator and other related structure thereabove through which the PTO shaft could not pass, the PTO shaft is routed from the engine E downwardly through an opening 18 in the rearward portion of the front chassis member 17. For the configuration of front-mounted implements attached to the front axle 12, the PTO shaft 50 must be free to swing from side to side with the steering movement of the front axle 12. Accordingly, the transverse width of the opening 18 is sufficiently large to accommodate the lateral movement of the PTO shaft.

Figure 3:
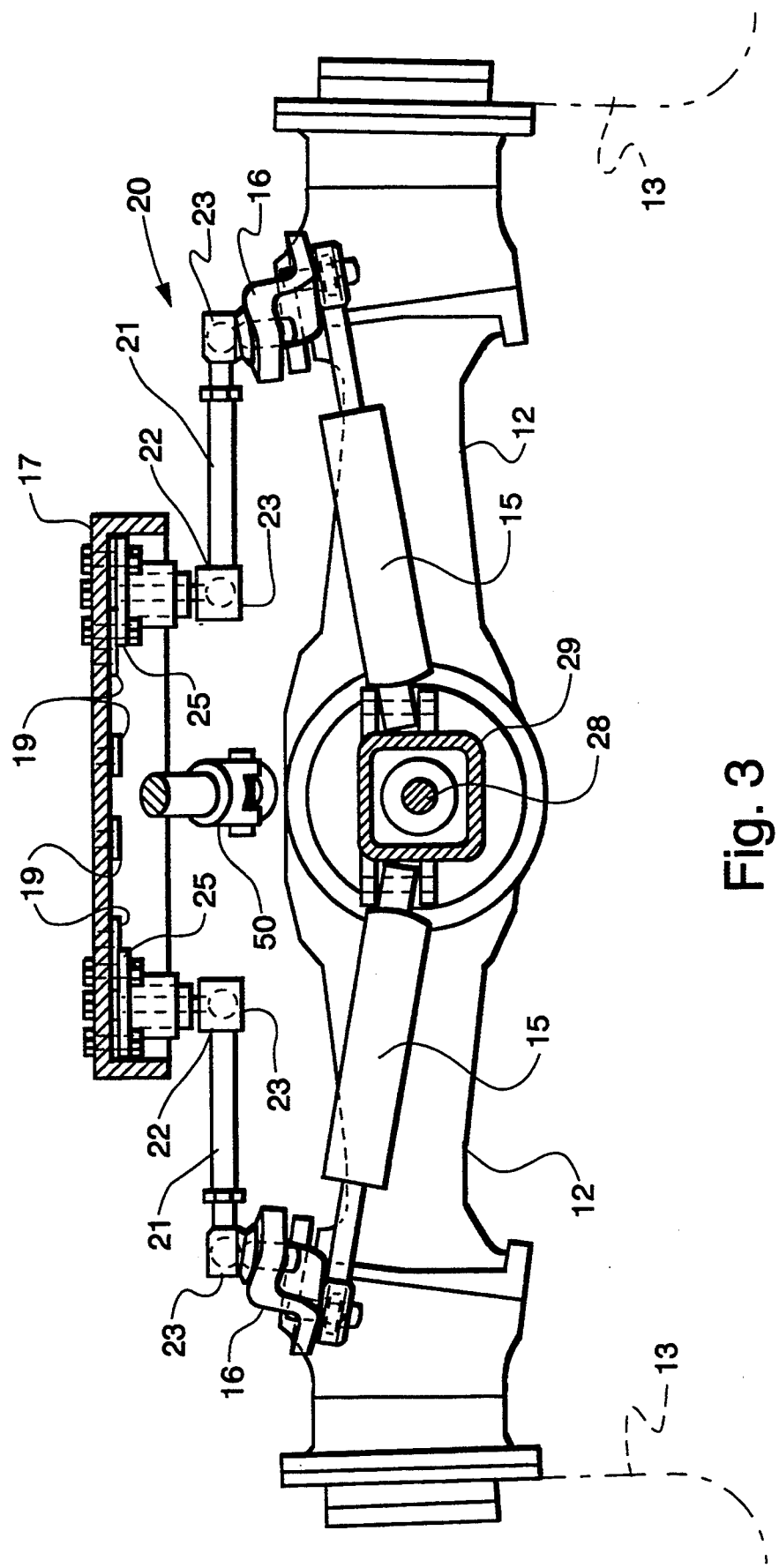
FIG. 3 is a cross-sectional view taken along lines 3—3 of FIG. 1 to better show the details of the tie rods and hydraulic steering cylinders, the tie rod mounting plates being positioned in their outboardmost position with a front power-takeoff shaft being utilized.

As best seen in FIG. 3, further clearance for the movement of the PTO shaft 50 can be obtained by relocating the tie rod mounting plates 25 outwardly with respect to the longitudinal centerline of the vehicle to the alternate mounting bosses 25. Because of the limited amount of vertical pivoting movement permitted by the structure of conventional tie rod ball joints 23, a greater amount of front axle rolling oscillation can be obtained when the tie rods 21 are normally oriented horizontally and kept as long as possible. The attachment of the mounting plates 25 at the inboardmost set of mounting bosses provides the least restriction to front axle rolling oscillation.

Figure 9:
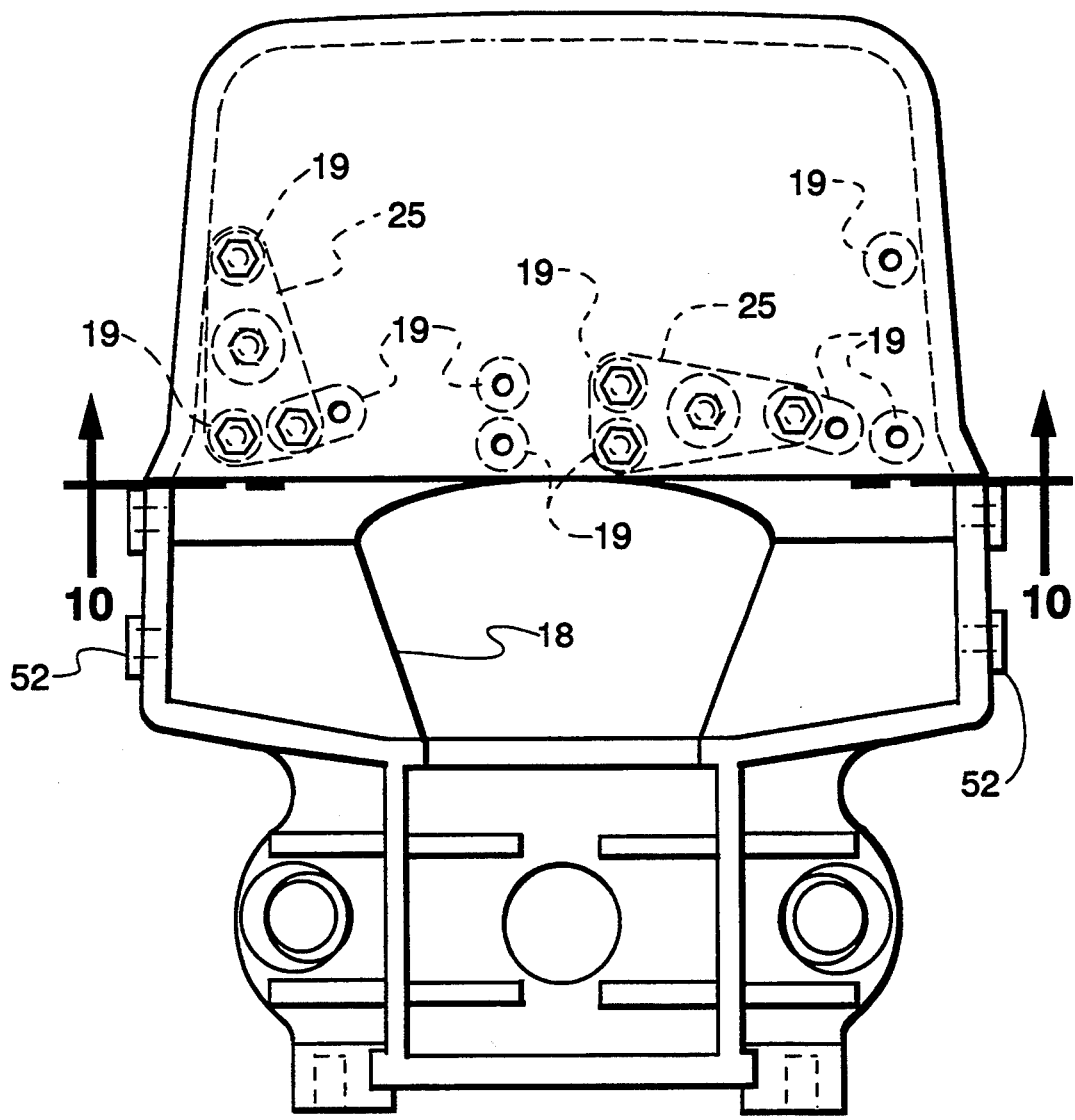
FIG. 9 is an enlarged detail view of the front chassis member to better depict the alternate mounting positions of the tie rod mounting plates shown in phantom, the left tie rod mounting plate being shown in the outboardmost position while the right tie rod mounting plate is shown in the inboardmost position, the related pivot mechanism and oscillation stop mechanism structure being removed for the purposes of clarity.
Figure 10:
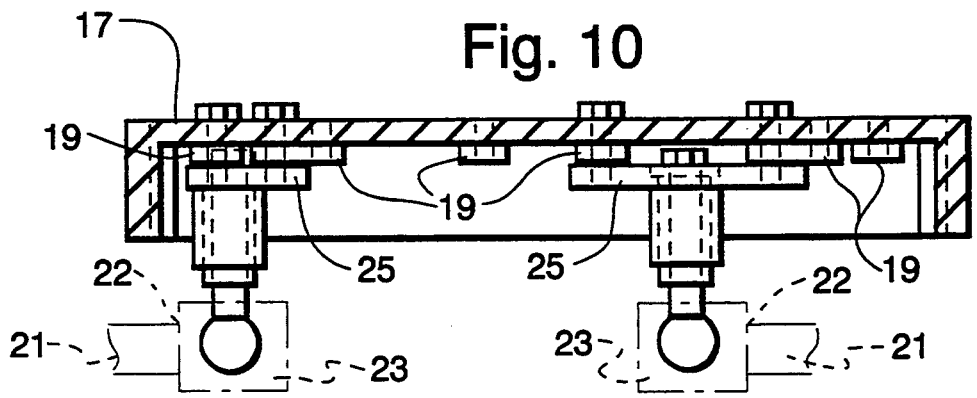
FIG. 10 is a partial cross-sectional view of the front chassis member taken along lines 10—10 of FIG. 9 to depict an elevational view of the tie rod mounting plates in their opposite respective positions.

By moving the tie rod mounting plates 25 to the outboardmost set of mounting bosses, shorter length tie rods 21 must be used, resulting in more severe vertical pivoting at the tie rod ball joints 23 for any given amount of front axle rolling oscillation. Greater clearance for the PTO shaft 50 can be obtained by an arrangement of the outboardmost set of mounting bosses 19 to orient the mounting plate 25 in a fore-and-aft direction, as shown in FIGS. 3, 9 and 10. When moving the inboard ends 22 of the tie rods 21 outwardly to the alternate chassis mounts, the required overall length of the respective tie rod 21 becomes shorter, which can be accommodated by an adjustable tie rod, such as the depicted configuration in which two halves of the tie rod are threadably engaged, or by replacing the tie rod 21 with a new tie rod 21 of proper length.

The trade-off for moving the tie rods 21 outwardly to provide adequate clearance for the swinging movement of the PTO shaft 50 is a more limited permissible rolling oscillation. Obviously, the operator is able to leave the tie rod mounting plates 25 at the inboardmost set of mounting bosses unless a front-mounted, PTO-driven implement is supported on the front axle 12 for lateral movement therewith, which in turn would require a lateral swinging movement of the PTO shaft and an adequate clearance for such motion. Nevertheless, whenever the tie rod mounting plates 25 are mounted on the outboardmost set of mounting bosses 19, the adjustment mechanism 45 should be manipulated to limit the amount of permissible rolling oscillation by the front axle 12 to a point below which the tie rod ball joints 23 would be damaged.

An alternative configuration of the pivots 32, 34 and 38 is shown in FIG. 7. The rearward pivot 38 is replaced by a thrust bearing 58 aligned with the oscillation axis 41 passing through the upper spherical pivot joint 32. The lower pivot joint 34 is replaced with a sleeve bearing 54 aligned with the steering axis 31 which also passes through the upper spherical pivot joint 32. Since the support link 35 is normally in tension while maintaining the longitudinal spacing of the lower pivot 34, 54 relative to the rearward pivot 38, 58, and since the support link 35 may not always be perpendicular to the steering axis 31, the sleeve bearings 54, 58 must be capable of resisting thrust. The lateral swinging movement of the lower pivot 34, 54 about the oscillation axis 41 is accommodated by the thrust bearing 58 and the spherical pivot joint 32. Likewise, the corresponding lateral swinging of the steering axis 31 will always have the sleeve bearing 54 aligned with the spherical pivot joint 32 to permit the front axle 12 to pivotally move about the steering axis 31.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. An oscillation stop apparatus for a tractor having a chassis; a front axle pivotally connected to said chassis for pivotal movement about a generally vertically extending steering axis, said front axle having laterally spaced steerable wheels pivotally mounted on the opposing ends thereof, said front axle also being pivotable about an oscillation axis to permit one of said steerable wheels to be positioned at a higher elevation than the other steerable wheel; and a steering mechanism operatively coupled with said steerable wheels to control the pivotal movement thereof and to effect a pivotal movement of said front axle about said steering axis, comprising:

a pair of laterally spaced upper brackets affixed to said chassis;

a pair of laterally spaced lower brackets affixed to said front axle and corresponding, respectively, to said upper brackets, said lower brackets being movable relative to said upper brackets in both a generally vertical direction and along an arcuate fore-and-aft direction centered on said steering axis; and a pair of laterally spaced stop links interengaged with the respective corresponding upper and lower brackets, each said stop link having an upper stop limit engageable with the corresponding upper bracket and a lower stop limit engageable with the corresponding lower bracket, each said stop link restricting the pivotal movement of said front axle about said oscillation axis whenever the linear distance between corresponding upper and lower brackets is equal to the linear distance between the corresponding said upper and lower stop limits, at least one of said stop limits being adjustable for selectively varying the linear distance between said upper stop limit and the corresponding said lower stop limit.

2. The oscillation stop apparatus of claim 1 wherein each said bracket has at least one seat formed therein for the engagement with a corresponding said stop limit.

3. The oscillation stop apparatus of claim 1 wherein each said stop limit includes a cup-shaped flange, said at least one adjustable stop limit having a nut affixed thereto and being threaded onto the corresponding said elongated stop link.

4. The oscillation stop apparatus of claim 3 wherein each said upper stop limit is positionally adjustable along the length of the corresponding said stop link.

5. The oscillation stop apparatus of claim 3 wherein the movement of said lower brackets about said steering axis changes the linear distance between each said lower bracket and the corresponding said upper bracket to vary the amount of pivotal movement of said front axle about said oscillation axis as a function of the extent of pivotal movement of said front axle about said steering axis.

6. The oscillation stop apparatus of claim 5 wherein said stop links are positionable in at least two different fore-and-aft orientations, a first of said different fore-and-aft orientations positions said stop links, when said tractor is in a straight ahead, non-turning condition, with one of said corresponding stop limits being longitudinally forward of the other said corresponding stop limit to provide different amounts of permissible oscillation as a function of the direction of steering movement.

7. The oscillation stop apparatus of claim 6 wherein a second of said different fore-and-aft orientations positions said stop links, when said tractor is in a straight ahead, non-turning condition, with said corresponding stop limits being longitudinally aligned to provide equal amounts of permissible oscillation irrespective of the direction of steering movement.

8. The oscillation stop apparatus of claim 7 wherein at least one of said brackets is provided with at least two seats formed therein for the engagement with a corresponding stop limit for the alternate selective positioning of the corresponding said stop link in said different orientations.

9. In a vehicle having a chassis; a front axle pivotally connected to said chassis for pivotal movement about a generally vertically extending steering axis, said front axle having laterally spaced steerable wheels pivotally mounted on the opposing ends thereof, said front axle also being pivotable about an oscillation axis to permit one of said steerable wheels to be positioned at a higher elevation than the other steerable wheel; a steering mechanism operatively coupled with said steerable wheels to control the pivotal movement thereof and to effect a pivotal movement of said front axle about said steering axis; an oscillation stop mechanism operatively interconnecting said chassis and said front axle to limit the amount of pivotal movement of said front axle about said oscillation axis, an improved oscillation stop mechanism comprising:

a pair of elongated stop links interengaging said chassis and said front axle and being respectively positioned on opposing sides of said steering axis, each said stop link including stop limits engageable, respectively, with said chassis and said front axle whenever a preselected amount of pivotal movement of said front axle about said oscillation axis has been achieved; and a pair of laterally spaced upper brackets affixed to said chassis, each said upper bracket having a seat formed therein for engagement with corresponding stop limits.

10. The vehicle of claim 9 wherein said front axle is provided with a pair of laterally spaced lower brackets affixed thereto, each said lower bracket having a seat formed therein for engagement with corresponding stop limits, each of said lower brackets corresponding to one of said upper brackets, said pairs of corresponding upper and lower brackets being oriented on opposing sides of said steering axis.

11. The vehicle of claim 10 wherein each said stop limit is engageable with a corresponding one of said brackets, one of said stop limits on each of said elongated stop links being positionally movable along the length of said stop link for selectively varying the linear distance between said corresponding stop limits.

12. The vehicle of claim 11 wherein each said stop limit comprises a cup-shaped flange having a curved surface for engagement with the corresponding said bracket.

13. The vehicle of claim 12 wherein said upper stop limit flange includes a nut connected thereto and being threaded on said elongated stop link to vary the position thereof along the length of said elongated stop link.

14. The vehicle of claim 12 wherein the movement of said lower brackets about said steering axis changes the linear distance between each said lower bracket and the corresponding said upper bracket to vary the amount of pivotal movement of said front axle about said oscillation axis as a function of the extent of pivotal movement of said front axle about said steering axis.

15. In a vehicle having a chassis; a front axle pivotally connected to said chassis for pivotal movement about a generally vertically extending steering axis, said front axle having laterally spaced steerable wheels pivotally mounted on the opposing ends thereof, said front axle also being pivotable about an oscillation axis to permit one of said steerable wheels to be positioned at a higher elevation than the other steerable wheel; a steering mechanism operatively coupled with said steerable wheels to control the pivotal movement thereof and to effect a pivotal movement of said front axle about said steering axis; an oscillation stop mechanism operatively interconnecting said chassis and said front axle to limit the amount of pivotal movement of said front axle about said oscillation axis, an improved oscillation stop mechanism comprising:

a pair of laterally spaced upper brackets affixed to said chassis;

a pair of laterally spaced lower brackets affixed to said front axle and corresponding, respectively, to said upper brackets, said lower brackets being movable relative to said upper brackets in both a generally vertical direction and along an arcuate fore-and-aft direction centered on said steering axis;

a pair of laterally spaced stop links interengaged with the respective corresponding upper and lower brackets, each said stop link having an upper stop limit engageable with the corresponding upper bracket and a lower stop limit engageable with the corresponding lower bracket, each said stop link restricting the pivotal movement of said front axle about said oscillation axis whenever the linear distance between corresponding upper and lower brackets is equal to the linear distance between the corresponding said upper and lower stop limits; and at least one of said brackets being provided with at least two seats formed therein for engagement with a corresponding stop limit for an alternate selective positioning of the corresponding said stop link in at least two different fore-and-aft orientations when said vehicle is in a straight ahead, non-turning condition, including a first orientation positioning said stop link with one of said corresponding stop limits being longitudinally forward of the other said corresponding stop limit to provide different amounts of permissible oscillation as a function of the direction of steering movement.

16. The vehicle of claim 15 wherein a second of said different fore-and-aft orientations positions said stop links, when said vehicle is in a straight ahead, non-turning condition, with said corresponding stop limits being longitudinally aligned to provide equal amounts of permissible oscillation irrespective of the direction of steering movement.

17. The vehicle of claim 16 wherein at least one of said stop limits is adjustable for selectively varying the linear distance between said upper stop limit and the corresponding said lower stop limit.

18. The vehicle of claim 17 wherein each said stop limit includes a cup-shaped flange, said upper stop limit being positionally adjustable and having a nut affixed thereto which is threadably engaged with the corresponding said stop link for positional adjustment along the length thereof.

* * * * *